(12) United States Patent
Kuo

(10) Patent No.: US 6,337,041 B1
(45) Date of Patent: Jan. 8, 2002

(54) METHOD FOR MAKING A VULCANIZED ELASTOMER CAPABLE OF COMBINING WITH POLYURETHANE WITHOUT USE OF ADHESIVE AND METHOD OF USING THE ELASTOMER SO MADE

(76) Inventor: Chih-Hsiung Kuo, No. 35, Sec. 1, Shang Hsing Street, Tali, Taichung Hsien (TW)

( * ) Notice: Subject to any disclaimer, the term of this patent is extended or adjusted under 35 U.S.C. 154(b) by 0 days.

(21) Appl. No.: 09/421,528

(22) Filed: Oct. 20, 1999

(51) Int. Cl.⁷ .................. B29C 35/00; B29C 45/14; B29C 31/50
(52) U.S. Cl. .................. 264/40.1; 264/85; 264/138; 264/140; 264/232; 264/233; 264/265; 264/326; 264/349; 264/328.2
(58) Field of Search .................. 264/40.1, 85, 109, 264/122, 265, 326, 349, 232, 138, 140, 233, 259, 328.1, 328.2

(56) References Cited

U.S. PATENT DOCUMENTS

| | | | | |
|---|---|---|---|---|
| 3,968,198 A | * | 7/1976 | Honda et al. | |
| 4,222,915 A | * | 9/1980 | Wolff et al. | |
| 4,579,871 A | * | 4/1986 | Linden et al. | |
| 4,666,782 A | * | 5/1987 | Tada et al. | |
| 4,861,842 A | * | 8/1989 | Cohen et al. | |

FOREIGN PATENT DOCUMENTS

| JP | 61-296033 | * 12/1986 |
|---|---|---|
| JP | 2-117829 | * 6/1990 |

* cited by examiner

*Primary Examiner*—Mathieu D. Vargot
(74) *Attorney, Agent, or Firm*—Browdy and Neimark

(57) ABSTRACT

A method is used to make a vulcanized elastomer capable of combining with Polyurethane to form a product without the use of an adhesive. The method includes the formation of the mixture of an vulcanizable elastomer. The mixture is stabilized in a nitrogen-containing chamber before the mixture is vulcanized. The vulcanized elastomer is formed in a molding tool and is subsequently degreased with a liquid containing a non-ionic interfacial agent. The degreased elastomer is dried by baking before being coated with the acetoacetate solution containing chloro cyanuric acid. The coated elastomer is dried again by baking before being stabilized in a dustproof environment for 48 hours. Upon completion of the dustproof stabilization, the elastomer is ready for combining with Polyurethane without the help of an adhesive.

23 Claims, 2 Drawing Sheets

METHOD FOR MAKING A VULCANIZED ELASTOMER CAPABLE OF COMBINING WITH POLYURETHANE WITHOUT USE OF ADHESIVE AND METHOD OF USING THE ELASTOMER SO MADE

FIELD OF THE INVENTION

The present invention relates generally to a method for making a vulcanized elastomer capable of combining with Polyurethane without the use of an adhesive, and a method of using the elastomer so made.

BACKGROUND OF THE INVENTION

The rubber material and the PU (Polyurethane) material are widely used in the footwear industry in view of the fact that the rubber material has an excellent wear-resistant property, which may be as high as 6000 or more in terms of NBS. However, the footwear made of the rubber material is relatively heavy, about 1.0 g/c.c. or more. On the other hand, the footwear made of the PU material, such as the polyester or polyester material, is relatively resilient, resistant to pressure and light in weight, with specific gravity being in the range of 0.3–0.6 g/c.c. However, the footwear made of Polyurethane is less resistant to wear, about 100 or less in terms of NBS.

In view of the advantages of the rubber material and the PU material, it has been suggested that the sole and the heel of a footwear are made of the rubber material, and that the rest of the footwear is made of the PU material. However, such a combination as described above is not technically feasible in view of the fact that the rubber material and the PU material are different from each other in functional base. There is an expensive way to combine the product of the rubber material with the product of the PU material. The surfaces of the product of the rubber material are first roughened and then cleansed with a solvent before applying a surface active agent to the surfaces. The treated surfaces are then coated with adhesive and must be filled with the PU material within three of four days after the surfaces have been coated with adhesive, so as to avoid a failure resulting from the reduction in the surface activity of the treated surfaces.

The prior art method described above is generally defective in design in that the rubber material and the PU material of the product are vulnerable to split, especially under the circumstance that the treatment is not carried out with precision. Moreover, the solvent or adhesive used in the prior art method may be hazardous to the health of workers. In addition, the test results show that the extent to which the product made by the prior art method is resistant to split is only about 2.5–3.0 kg/cm$^2$. By taking all aspects of the prior art method into consideration, it is readily apparent that the prior art method is neither cost-effective nor competitive.

SUMMARY OF THE INVENTION

It is therefore the primary objective of the present invention to provide a pollution-free method for making a vulcanized elastomer capable of combing with Polyurethane without the use of an adhesive.

It is another objective of the present invention to provide an improved method for making a vulcanized elastomer capable of combining with Polyurethane to form a product without resorting to an adhesive. The product so made is relatively less vulnerable to split as compared with the product made by the prior art method.

It is still another objective of the present invention to provide a flexible method for making a vulcanized elastomer which can be set aside for a period longer than the period (3 or 4 days) required by the prior art method before the elastomer is combined with Polyurethane without using an adhesive.

It is still another objective of the present invention to provide a cost-effective method for making a vulcanized elastomer capable of being combined with Polyurethane without the use of an adhesive.

In keeping with the principle of the present invention, the foregoing objective of the present invention are attained by a method for making a vulcanized elastomer which can be combined with Polyurethane to form a product without the use of an adhesive. The method comprises a first step in which a mixture is formed by mixing in a mixer a vulcanizable elastomer, a filling agent, an active agent, an aging resistant agent, and a process aiding agent. The mixing process is carried out at a temperature ranging between 150° C. and 160° C. for less than five minutes. The flakes made of the mixture are kept in an airtight chamber containing the nitrogen gas and having a temperature ranging between 15° C. and 20° C. for at least 24 hours for stabilizing the physical properties of the flakes. The stabilized flakes are transferred to a mixer in which the vulcanization is carried out in the presence of a vulcanization promoting agent. The vulcanized flakes are removed from the mixer and are then arranged in a molding tool to take form at a temperature ranging between 150° C. and 160° C. for 5–6 minutes. The elastomer formed in the molding tool is removed from the molding tool and is then soaked in a solution containing water and 10–15% of a non-ionic interfacial agent for 4–5 minutes to bring about the degreasing of the elastomer. The degreasing is carried out in the solution having a temperature ranging between 70° C. and 85° C. The degreased elastomer is then rinsed for 1–3 minutes with an aqueous solution containing sodium hypochlorite which contains 6–10% of "effective chlorine". Upon completion of the washing of the elastomer, the elastomer is dried by baking. The dry elastomer is coated with the acetoacetate solution containing 1–3% of chloro cyanuric acid before the elastomer is dried again by baking. The dry elastomer is then allowed to sit without disturbance in a dustproof environment for 48 hours before the elastomer is combined with Polyurethane.

The foregoing objective, features, functions, and advantages of the present invention will be more readily understood upon a thoughtful deliberation of the following detailed description of an embodiment of the present invention in conjunction with the accompanying drawings.

DETAILED DESCRIPTION OF THE INVENTION

The embodiment of the present invention comprises the steps which are described explicitly hereinafter.

A mixture is formed by mixing in a mixer a vulcanizable elastomer, a filling agent, an active agent, an aging resistant agent, and a process aiding agent. The mixing process is carried out at a temperature ranging between 150° C. and 160° C. for a period lasting less than five minutes.

The vulcanizable elastomer used in the present invention is natural rubber (NR) or synthetic rubber such as styrene butadiene rubber (SBR), poly butadiene rubber, sponge rubber, millable gum urethane, etc. A compound containing 15–30% by weight of natural rubber and 65–80% by weight of SBR may be also used as the vulcanizable elastomer.

The filling agent used in the present invention is composed of 5–40% by weight of vibrathane, 30–50% by weight of silica, and 5–15% by weight of silane. The vibrathane is a trademark for the millable urethane elastomer produced by Uniroyal Chemical Company of the United States.

The active agent used in the present invention is zinc oxide in the amount of 1–6% by weight.

The aging resistant agent used in the present invention is 0.5–5.0% by weight of TMQ (2,2,4-trimethyl 1,2-dihydro quinoline).

The process aiding agent used in the present invention is 1.5–6.0% by weight of PEG (polyethylene glycol) or DOP (dioctyl phthalate).

For better results, the mixing sequence and temperature must be strictly observed. In addition, the mixing time must not exceed five minutes. The strict observation of the mixing sequence, temperature and time is required for bringing about a thorough reaction between the silane and the elastomer.

The mixture so made is then used to make flakes having a thickness ranging between 2–5 mm. The flakes must be transferred immediately to an airtight chamber containing the nitrogen gas. The flakes are allowed to sit in the airtight chamber at a temperature ranging between 15° C. and 20° C. for at least 24 hours for the purpose of stabilizing the physical properties of the flakes.

The stabilized flakes are then removed from the airtight chamber and mixed in a mixer with sulfur, vulcanization promoting agent, pigment, fungicide, etc. In order to promote a uniform mixing, the temperature must be allowed to rise rapidly. As the mixing process is under way, the samples must be taken and tested by a Rheometer from time to time, with T90 ranging between 4 and 5 minutes. Additional vulcanization promoting agent may be added if necessary. The vulcanization promoting agent used in the present invention is tetra methyl thiuramdisulfide (TMTD) in the amount of 0.1–1.0% by weight. The sulfur used in the present invention is SIS80 in amount of 1–3% by weight.

The vulcanized elastomer is formed in a molding tool in which an appropriate amount of the properly-vulcanized flakes are arranged. The molding tool is subjected to temperature ranging between 150° C. and 160° C. for 5–6 minutes.

Figure 1:
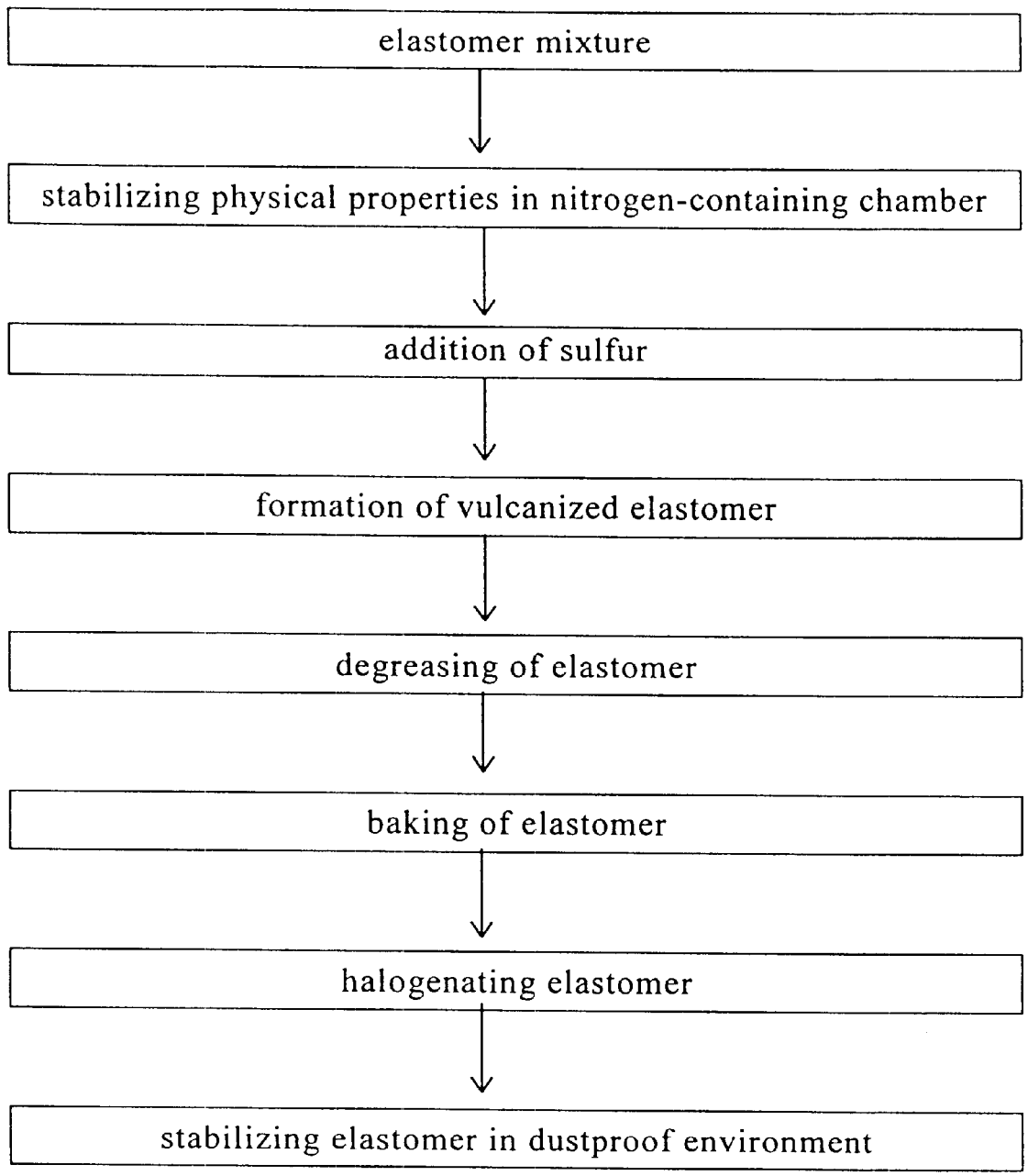
FIG. 1 shows a flow chart of the embodiment of the present invention.
Figure 2:
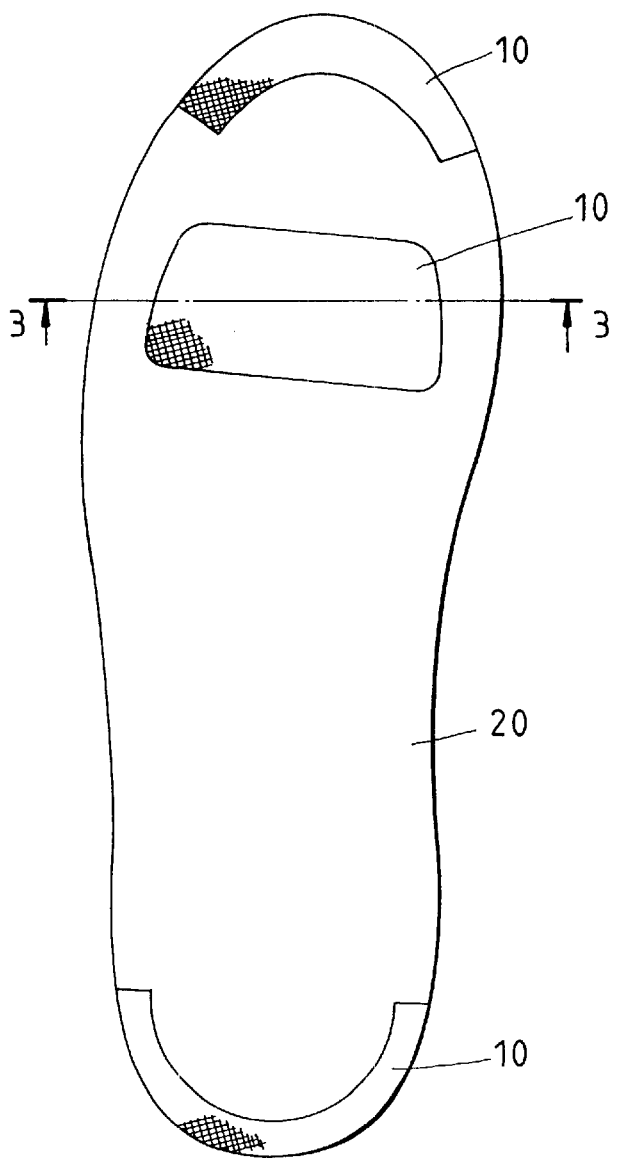
FIG. 2 shows a plan view of a product of the embodiment of the present invention.
Figure 3:
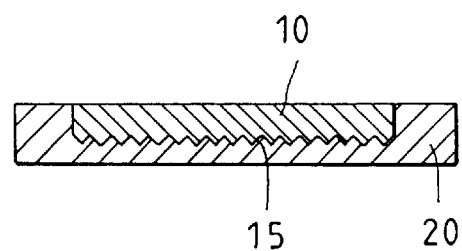
FIG. 3 shows a sectional view taken along the line 3—3 as shown in FIG. 2.

The molding tool is so specifically designed as to enable the vulcanized elastomer 10 to have a large surface area 15, as illustrated in FIGS. 2 and 3. The large surface area 15 is intended to combine with a PU material 20 such that the vulcanized elastomer 10 is fastened securely with the PU material 20. The design of the molding tool surface area may be linear, dotted, polygonal, tapered, or circular. The design form of the molding tool may be regular or irregular.

The elastomer 10 is removed from the molding tool and trimmed before it is subjected to the degreasing treatment, which comprises the steps of (a) soaking the elastomer 10 in an aqueous solution containing 10–15% of a non-ionic surfactant and having a temperature ranging between 70° C. and 85° C. for a period lasting between 4 and 5 minutes; and (b) rinsing the elastomer 10 with an aqueous solution containing sodium hypochlorite which contains 6–10% of "effective chlorine", for a period lasting between 1 and 3 minutes.

The degreased elastomer 10 is then dried in an oven at a temperature ranging between 60° C. and 70° C. for 3–4 minutes.

The dry elastomer 10 is sprayed with the acetoacetate solution containing 1–3% of chloro cyanuric acid and is then dried again by baking at a temperature ranging between 30° C. and 50° C.

The dry elastomer 10 is finally allowed to sit without disturbance in a dustproof environment for 48 hours before the elastomer 10 is combined with the Polyurethane. The elastomer 10 may be contained in a paper box, a paper bag, a plastic bag, etc., to prevent the elastomer 10 from being contaminated by dust or foreign objects. The elastomer 10 is allowed to sit for 48 hours for the purpose of stabilizing the physical properties of the elastomer 10 which is sprayed with the acetoacetate solution containing chloro cyanuric acid.

The vulcanized elastomer so made by the method of the present invention can be combined with the Polyurethane without the use of an adhesive within five months from the date of the production of the vulcanized elastomer.

The combination of the vulcanized elastomer of the present invention with the Polyurethane is brought about by a molding tool in which the vulcanized elastomer is arranged before the Polyurethane is introduced into the molding tool by injection at a temperature ranging between 50° C. and 55° C. for promoting the combination process as well as the curing of the Polyurethane. It is suggested that the Polyurethane must be more than 3 mm in thickness to ensure a successful combination with the vulcanized elastomer. The Polyurethane may be a product made of polyethers, polyesters, or a compound formed of polyether and polyester in different proportions. The process of injecting the Polyurethane must be completed within 3 seconds while the cream time must not exceed 10 seconds. It is preferable that the combination process is completed within one minute. Preferably, the molecular weight of the Polyurethane ranges between 1250 and 3000. Similarly, the prepolymer has a molecular weight ranging between 2000 and 3000. The addition of an additive, such as an UV-stabilizing agent, and antistatic agent, a hydrolysis-resistant agent, a fungicide, etc., to the Polyurethane body will not undermine the combination strength of the Polyurethane body. The product made of the vulcanized elastomer and the Polyurethane must be cured for at least 24 hours after being removed from the molding tool.

The vulcanization ingredients of the present invention are listed as follows:

| Ingredients | Proportions | Supplier of ingredients |
| --- | --- | --- |
| SBR | 60.0 | Taiwan Synthetic Rubber |
| NR | 25.0 | Taiwan Synthetic Rubber |
| Vibrathane | 10.0 | Uniroyal Chemical |
| Silica | 40.0 | Wacker Chemical |
| Silane | 10.0 | |
| Zinc oxide | 3.0 | Chi Chen Chemical |
| TMQ | 3.0 | Monsanto |
| PEG 4000 | 4.0 | Panyan |
| TMTD | 0.5 | |
| SIS 80 | 1.0 | Rhein Chemical |

The comparative data of the prior art method and the method of the present invention are listed as follows:

|  | Prior Art | Present Invention |
|---|---|---|
| Split of elastomer and PU | 2.5 kg/cm$^2$ | 7.0 kg/cm$^2$ and over |
| Use of adhesive | yes | no |
| Shelf life of elastomer | 4 days | 5 months |

What is claimed is:

1. A method for making a vulcanized elastomer capable of combining with polyurethane without the use of an adhesive, said method comprising the steps of:
   (a) forming a mixture by mixing in a mixer a vulcanizable elastomer, a filling agent, an active agent, an aging resistant agent, and a process aiding agent, at a temperature ranging between 150° C. and 160° C. for a period lasting less than 5 minutes;
   (b) transforming the mixture into flakes which are kept in an airtight chamber containing nitrogen gas and having a temperature ranging between 15° C. and 20° C. for an least 24 hours for stabilizing the physical properties of the flakes;
   (c) transferring the stabilized flakes to a mixer into which sulfur and a vulcanization promoting agent are introduced, and vulcanizing said flakes;
   (d) removing the vulcanized flakes from the mixer and arranging the flakes in a molding tool and molding the flakes to take the form of an elastomer, said molding being carried out at a temperature ranging between 150° C. and 160° C. for 5–6 minutes;
   (e) removing the elastomer from the molding tool and trimming the elastomer before the elastomer is soaked in an aqueous solution containing 10–15% of a non-ionic interfacial agent for 4–5 minutes for degreasing the elastomer at a temperature ranging between 70° C. and 85° C., the degreased elastomer being rinsed for 1–3 minutes with an aqueous solution containing sodium hypochlorite which contains 6–10% of effective chlorine;
   (f) baking the degreased elastomer;
   (g) coating the dry elastomer with acetoacetate solution containing 1–3% of chloro cyanuric acid before the elastomer is dried again by baking; and
   (h) allowing the dry elastomer to sit without disturbance in a dustproof environment for 48 hours before the elastomer is combined with a polyurethane material without the use of an adhesive.

2. The method as defined in claim 1, wherein the vulcanized flakes are tested with a Rheometer and for keeping T90 in a range of 4–5 minutes.

3. The method as defined in claim 1, wherein the flakes in step (d) are molded at a temperature ranging between 150° C. and 160° C. for 5–6 minutes.

4. The method as defined in claim 1, wherein the baking in the step (f) is carried out at a temperature ranging between 60° C. and 70° C. for 3–4 minutes.

5. The method as defined in claim 1, wherein the mixture is formed in step (a) by mixing in sequence the vulcanizable elastomer, the filling agent, the active agent, the aging resistant agent, and the process aiding agent.

6. The method as defined in claim 1, wherein the vulcanizable elastomer is made of natural rubber, synthetic rubber, or a compound formed of natural rubber and synthetic rubber.

7. The method as defined in claim 6, wherein the synthetic rubber is styrene butadiene rubber (SBR), poly butadiene rubber, sponge rubber, or millable gum urethane.

8. The method as defined in claim 6, wherein the vulcanizable elastomer is composed of 15–30% by weight of natural rubber (NR) and 65–80% by weight of styrene butadiene rubber (SBR).

9. The method as defined in claim 1, wherein the filling agent is composed of 5–40% by weight of millable urethane elastomer, 30–50% by weight of silica, and 5–15% by weight of silane.

10. The method as defined in claim 1, wherein the active agent is zinc oxide in proportion of 1–6% by weight.

11. The method as defined in claim 1, wherein the aging resistant agent is 2,2,4-trimethyl 1,2-dihydro quinoline (TMQ) in proportion of 0.5–5.0% by weight.

12. The method as defined in claim 1, wherein the process aiding agent is polyethylene glycol or dioctyl phthalate, in proportion of 1.5–6.0% by weight.

13. The method as defined in claim 1, wherein the flakes of the step (b) have a thickness ranging between 2 and 5 mm.

14. The method as defined in claim 1, wherein the sulfur of the step (c) is added in a proportion ranging between 1% by weight and 3% by weight.

15. The method as defined in claim 1, wherein the vulcanization promoting agent of the step (c) is added in a proportion ranging between 0.1% by weight and 1.0% by weight; and wherein the vulcanization promoting agent is tetramethyl thiuramdisulfide.

16. The method as defined in claim 1, wherein the molding tool of step (d) molds the elastomer in such a manner that the elastomer has as large a surface area as possible.

17. The method as defined in claim 1, wherein the elastomer of step (h) is combined with polyurethane to form a product by arranging the elastomer in a molding tool into which the polyurethane is introduced by injection before the molding tool is heated at a temperature ranging between 50° C. and 55° C.

18. The method as defined in claim 17, wherein the polyurethane has a thickness greater than 3 mm.

19. The method as defined in claim 17, wherein the injection of the polyurethane is completed within 3 seconds.

20. The method as defined in claim 17, wherein the polyurethane has a cream time no longer than 10 seconds; and wherein the combination of the elastomer and the polyurethane is completed within one minute.

21. The method as defined in claim 17, wherein the polyurethane has a molecular weight ranging between 1250 and 3000.

22. The method as defined in claim 17, wherein the product is cured for at least 24 hours after the product is removed from the molding tool.

23. The method as defined in claim 17, wherein the polyurethane contains one or more additives selected from the group consisting of a UV stabilizing agent, an antistatic agent, a hydrolysis resistant agent, and a fungicide.

* * * * *